United States Patent [19]

Doswald

[11] Patent Number: 5,698,681
[45] Date of Patent: Dec. 16, 1997

[54] REACTIVE DISAZO DYESTUFF COMPOUNDS CONTAINING HALO-SUBSTITUTED TRIAZINYL RINGS

[75] Inventor: Paul Doswald, Münchenstein, Switzerland

[73] Assignee: Clariant Finance (BVI) Limited, Tortola, Virgin Islands (Br.)

[21] Appl. No.: 671,785

[22] Filed: Jun. 19, 1996

Related U.S. Application Data

[63] Continuation of Ser. No. 437,098, May 5, 1995, abandoned.

[30] Foreign Application Priority Data

May 6, 1994 [DE] Germany ............... 44 16 071.2

[51] Int. Cl.$^6$ ............... C09B 62/09; D06P 1/382; D06P 3/26; D06P 3/66
[52] U.S. Cl. ............... 534/634; 534/772
[58] Field of Search ............... 534/634, 772

[56] References Cited

U.S. PATENT DOCUMENTS

| | | | |
|---|---|---|---|
| 3,627,474 | 12/1971 | Eckersley et al. | 8/25 |
| 3,905,950 | 9/1975 | Crabtree | 548/634 X |
| 3,926,944 | 12/1975 | Berrie et al. | 534/634 |
| 4,228,071 | 10/1980 | Riat et al. | 534/638 |
| 4,843,150 | 6/1989 | Hihara et al. | 534/634 |
| 5,149,789 | 9/1992 | Jessen et al. I | 534/618 |
| 5,175,259 | 12/1992 | Jessen et al. II | 534/606 |
| 5,175,261 | 12/1992 | Ridyard | 534/631 |
| 5,245,020 | 9/1993 | Jessen et al. III | 534/618 |
| 5,386,015 | 1/1995 | Doswald et al. | 534/637 |

FOREIGN PATENT DOCUMENTS

| | | | |
|---|---|---|---|
| 142863 | 5/1985 | European Pat. Off. | 534/634 |
| 36 13 304 | 11/1986 | Germany | 534/606 |
| 36 17 513 | 9/1987 | Germany | 534/634 |
| 42 27 590 | 2/1994 | Germany | 534/757 |
| 1036 366 | 2/1985 | Japan | 534/634 |
| 1047 755 | 5/1985 | Japan | 534/634 |
| 1036 365 | 2/1986 | Japan | 534/634 |
| 1261 361 | 10/1989 | Japan | 534/634 |
| 1261 362 | 10/1989 | Japan | 534/634 |
| 1 384 056 | 2/1975 | United Kingdom | 534/638 |
| 2166 752 | 5/1986 | United Kingdom | 534/634 |
| 2173 210 | 10/1986 | United Kingdom | 534/634 |
| 2271 776 | 4/1994 | United Kingdom | 534/638 |

OTHER PUBLICATIONS

Search report, GB 9509080.9, dated 28 Jul. 1995.

*Primary Examiner*—Floyd D. Higel
*Attorney, Agent, or Firm*—Hesna J. Pfeiffer

[57] ABSTRACT

Fiber-reactive disazo dyes correspond to formula I,

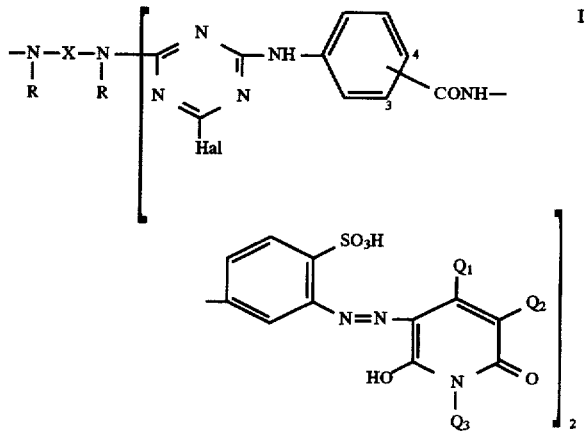

and they are present as free acids or in salt form. They are used as reactive dyes for dyeing or printing hydroxy-group-containing or nitrogen-containing organic substrates, especially leather or fibrous material, which consists of or contains natural or synthetic polyamides or natural or regenerated cellulose. The dyeings obtained have high fixation values and good light fastness.

4 Claims, No Drawings

REACTIVE DISAZO DYESTUFF COMPOUNDS CONTAINING HALO-SUBSTITUTED TRIAZINYL RINGS

This is a continuation of application U.S. Ser. No. 08/437,098, filed May 5, 1995, now abandoned.

The invention relates to fiber-reactive disazo dyes, processes for their production and their use as reactive dyes in dyeing and printing processes.

The objects of the invention are compounds of formula I

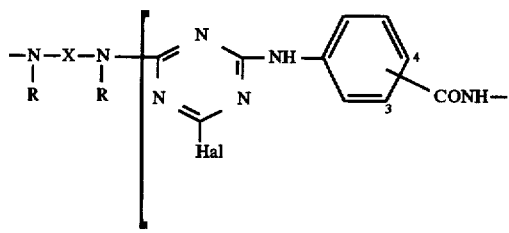

and their salts, wherein $Q_1$ denotes hydrogen, $C_1$–$C_4$-alkyl, —$CH_2SO_3H$ or —COOH, $Q_2$ denotes hydrogen, —CN, —$CONH_2$ or —$CH_2SO_3H$, $Q_3$ denotes hydrogen, $C_1$–$C_4$-alkyl or substituted $C_1$–$C_4$-alkyl, each group R, independently of one another, denotes hydrogen or $C_1$–$C_4$-alkyl, or together form a $C_1$–$C_4$-alkylene bridge, X denotes an aliphatic or aromatic connecting member and Hal denotes chlorine or fluorine, and the carbonyl carbon atom of the group —CONH— is bonded to the phenyl radical in 3- or 4-position.

In a compound of formula I, each alkyl or alkylene group may be linear or branched and may be substituted with a hydroxyl group. In a hydroxy-substituted alkyl or alkylene group, which is bonded to nitrogen, the hydroxy group is preferably bonded to a C-atom which is not directly bonded to nitrogen.

$Q_1$ preferably signifies methyl, —$CH_2SO_3H$ or COOH, more preferably methyl.

$Q_2$ preferably signifies —$CH_2SO_3H$.

$Q_3$ preferably signifies hydrogen, methyl or ethyl, or methyl or ethyl bearing a sulphonic acid radical substituent, more preferably $Q_3$ represents an ethyl group.

Each group R is preferably signified by hydrogen, —$CH_3$, or both groups R together signify an ethylene bridge.

X preferably signifies a straight-chain or branched $C_{2-3}$-alkylene bridge, a straight chain or branched $C_{2-3}$alkylene bridge bearing a hydroxyl substituent, a phenylene bridge or a phenylene bridge-bearing a methyl or a sulphonic acid radical substituent, more preferably X signifies a 1,2-propylene group.

Hal preferably signifies chlorine.

The carbonyl carbon atom of the group —CONH— is preferably bonded to the phenyl radical at the 4-position.

Preferred compounds are according to the formula Ia

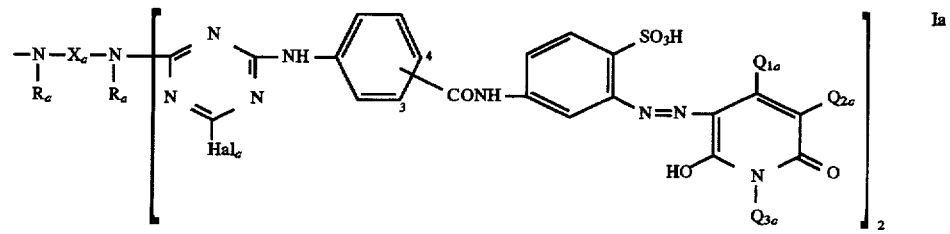

and their salts, wherein $Q_{1a}$ denotes methyl, —$CH_2SO_3H$ or COOH, $Q_{2a}$ denotes —$CH_2SO_3H$, $Q_{3a}$ denotes hydrogen, methyl or ethyl, or methyl or ethyl bearing a sulphonic acid substituent.

$R_a$ denotes hydrogen, methyl or both $R_a$ together denotes an ethylene bridge, $X_a$ denotes a straight-chain or branched $C_2$–$C_3$-alkylene bridge, a $C_2$–$C_3$alkylene bridge bearing a hydroxy substituent, a phenylene bridge, or a phenylene bridge bearing a methyl or a sulphonic acid radical substituent, and $Hal_a$ signifies chlorine, and the carbonyl carbon atom of the group —CONH— is bonded to the phenyl radical at the 3- or 4-position, preferably at the 4-position.

A particularly preferred compound according to the invention has the formula

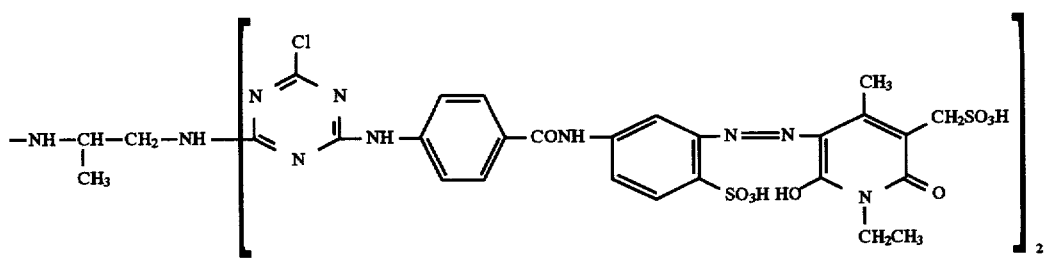

When compounds of formula I are in the salt form, the constitution of the cation of the sulphonate groups and any carboxylate groups which may be present is not a vital factor, but may be any non-chromophoric cation conventional in the chemistry of reactive dyes provided that the corresponding salts fulfill the water solubility requirements.

Examples of suitable cations are alkali metal ions or unsubstituted or substituted ammonium ions, for example lithium, sodium, potassium, ammonium, mono-, di-, tri- and tetramethylammonium, triethylammonium and mono-, di- and tri-ethanolammonium.

Preferred cations are the alkali metal ions and the ammonium cation, of which sodium is the particularly preferred cation.

The cations of the sulphonate groups and any carboxylate groups in compounds of formula I when in their salt form may be the same or different and represent a mixture of the above-mentioned cations, i.e. the compounds may exist in mixed salt form.

The invention provides in another of its aspects a process of forming compounds according to formula I comprising reacting a compound of formula II

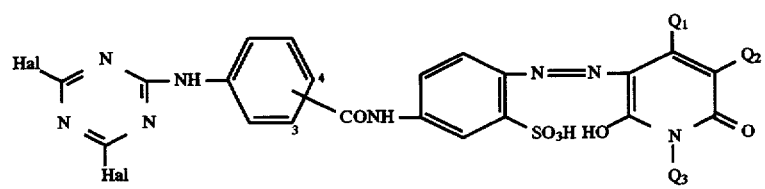

with a compound of formula III

wherein $Q_1$, $Q_2$, $Q_3$, R, X and Hal are as hereinabove defined.

The reaction is preferably carried out in an aqueous medium. The reaction medium is maintained under basic conditions, preferably at a pH of from 8 to 8.5. The reaction temperature is from about 20° to 60° C. and is preferably carried out at a temperature of from 35° to 45° C., more preferably 40° C.

Compounds of formula II are obtained, for example, when a compound of formula IV

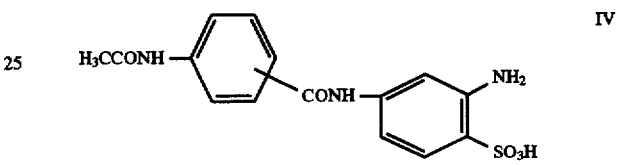

is diazotised and coupled with a coupling component of formula V

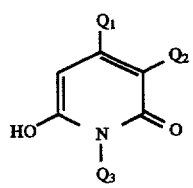

whereby the compound of formula

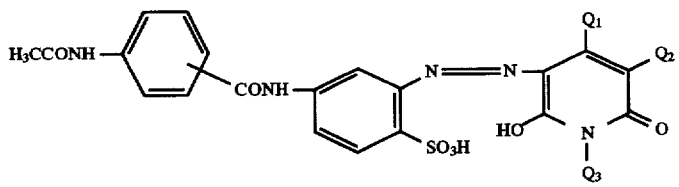

is obtained, then the acetyl group is cleaved under acidic conditions i.e. with 3 to 6% hydrochloric acid and at a temperature of between 75° C. to 95° C. preferably 80° C. and the compound obtained is condensed with cyanuric halide in an aqueous medium, preferably having a pH of 4 to 7 and at a temperature of between 0° to 5° C. to form the compound of formula II.

Isolation of the compounds of formula I may take place in a known manner, e.g., the compounds may be separated from the reaction mixture by a conventional salting out with alkali metal salts before filtering and drying, optionally under vacuum at a slightly elevated temperature.

Depending on the reaction and isolation conditions, a compound of formula I is obtained as a free acid or preferably in salt form or a mixed salt, in which case it contains, for example, one or several of the above-mentioned cations. Salts or mixed salts may however also be produced from the free acid in a manner which is conventional per se, and vice versa, or a conventional transformation of salts may be undertaken.

The compounds of formulae III to V are either known starting materials or may be obtained by conventional syntheses from known starting compounds.

The compounds of formula I, their salts and mixtures thereof are reactive dyes and are suitable for dyeing or printing hydroxy-group-containing or nitrogen-containing organic substrates.

Accordingly, in another aspect of the invention there is provided a process of dyeing or printing hydroxy group-containing or nitrogen-containing organic substrates wherein the dyeing is effected with compounds hereinabove defined, their salts or mixtures thereof.

It is to be understood, that any reference made above or hereinafter to compounds or salts in the plural is also reference to compound or salt in the singular.

Preferred substrates are leather and fibrous materials which consist of or contain natural or synthetic polyamides and in particular natural or regenerated cellulose, such as cotton, viscose or rayon staple fiber. The substrate which is usually preferred is textile material consisting of or containing cotton.

In yet another aspect of the invention there is provided the use of compounds hereinabove defined, their salts or mixtures thereof in dyeing or printing substrates hereinabove described.

The compounds of formula I may be employed in dye baths or in printing pastes according to all the dyeing or printing processes which are conventional for reactive dyes. Dyeing is preferably effected by the exhaust process at a temperature range of 80°–100° C.

The compounds according to the invention and their salts may be used as individual dyes or as mixtures of compounds, mixtures of salts or mixtures of compounds and salts. Furthermore, in view of their good compatibility with certain other reactive dyestuffs, the compounds, their salts or mixtures thereof may comprise part of a combination dyeing composition With certain other reactive dyestuffs of the same class, certain other reactive dyestuffs which display comparable dyeing properties, e.g. all round fastness and exhaust values, as compounds and salts of the invention.

In a further aspect of the invention there is provided a hydroxy-containing or nitrogen containing organic substrate dyed or printed in accordance with a dyeing or printing process described above.

Good exhaust and fixation values are obtained with the compounds of formula I. The unfixed part of the dye may be readily washed out. The dyeings and prints obtained have good light fastness and also light fastness when wet. In addition, they have good wet fastness properties, e.g. to washing, water, sea water and perspiration, and have good resistance towards oxidative influences such as to chlorine-containing water, hypochlorite bleaches, peroxide bleaches and perborate-containing detergents.

The following examples serve to illustrate the invention. In the examples, the parts are by weight or by volume and the percentages are by weight or by volume; the temperatures are given in degrees celsius.

EXAMPLE 1

A solution of 61.5 parts of 3-amino-1-(-aminobenzoylamino)-benzene-4-sulphonic acid in 700 parts of water was set at pH 6 with 14.5 parts of 30% hydrochloric acid. 27.5 parts of acetic anhydride were added dropwise over the course of 2 hours with the pH remaining at between 5.9 and 6.1. The pH value is hereby maintained with 150 parts of 15% lithium hydroxide. During the reaction, the temperature was maintained at between 10° and 15° C. Thereafter the pH Was adjusted to 4.0 with 32 parts of 30% hydrochloric acid, and the product salted out with 150 parts of sodium chloride. The solution was filtered leaving a precipitate of compound A (61 parts)

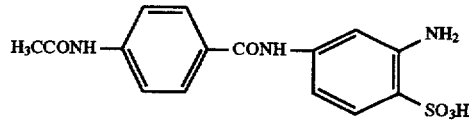

69.8 parts of compound A in 600 parts of water were mixed with 63 parts of 30% hydrochloric acid, and 13.8 parts of a 4N solution sodium nitrite. After neutralizing the excess nitrite with sulphaminic acid, 58 parts of 1-ethyl-5-carbamoyl-6-hydroxy-4-methyl-3-sulphomethylpyridone were added to the solution and the pH adjusted to 5.0 with 90 parts of 15% sodium hydroxide solution. A cloudy solution of compound B was obtained, with the following formula:

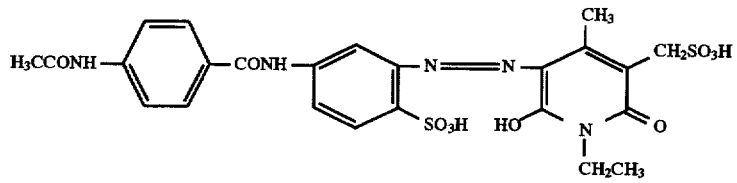

The solution of compound B was mixed with 260 parts of 30% hydrochloric acid and stirred for 4 hours at 80° C. A yellow precipate of compound C with the following formula was filtered off at 25° C.

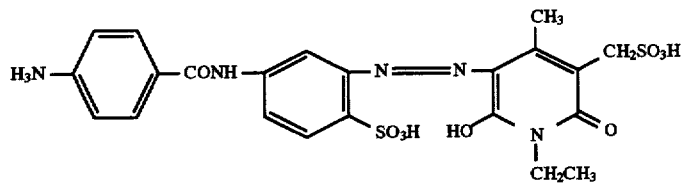

135 parts of compound C were suspended in 400 parts of water. 37 parts of cyanuric chloride, which were stirred in 200 parts of ice and 80 parts of water for 20 minutes, were added to the suspension over 20 minutes. During this time, the temperature was maintained at between 0° and 5° C. with an ice bath, and the pH was maintained at between 4.0 and 6.0 with 125 parts of 15% sodium hydroxide. After 4–5 hours, condensation was complete, and a cloudy yellow solution of the dichlorotriazine dyestuff of the formula

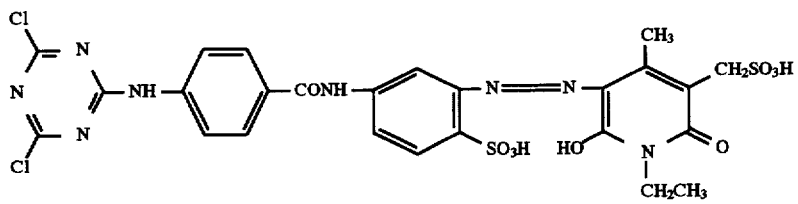

was obtained. The cloudy solution of the dichlorotriazine dyestuff was adjusted to pH 7.0 with 4 parts of 15% lithium hydroxide solution and heated to 40° C. Thereafter, 8 parts of 1,2-diaminopropane were added dropwise over the course of 30 minutes at a pH of between 8.0 and 8.5. After 2–3 hours at pH 8.0 to 8.5, condensation was complete. During the course of reaction, 100 parts of 15% lithium hydroxide solution were used to maintain the pH value. The dichlorotriazine dyestuff was salted out with 190 parts of sodium chloride at 50°–60° C., filtered off and dried. 228 parts of a yellow dichlorotriazine dyestuff of formula

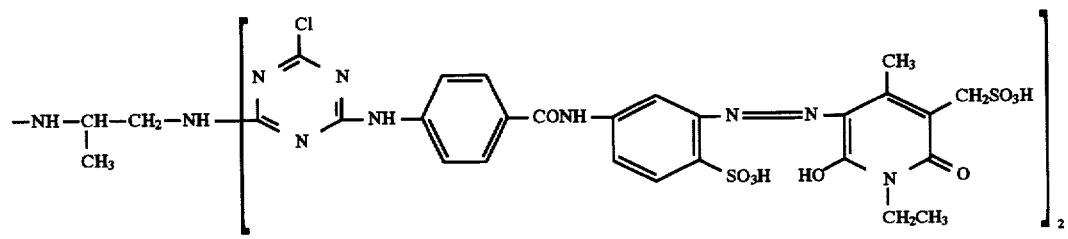

were obtained with a λmax of 422 nm (water).

The dyeings and prints made with this dyestuff on cotton by the usual method were greenish-yellow. They were notable for their good light fastness, resistance towards oxidative influences, and good fixation values.

EXAMPLES 2–13

Further compounds of formula I were produced analogously to the method described in Example 1, using corresponding starting materials. They are listed in the following Table.

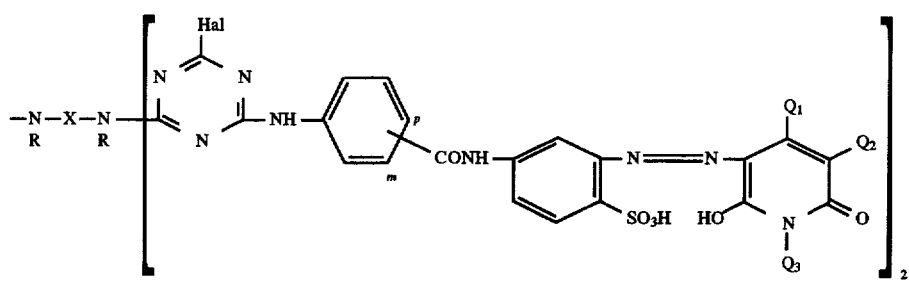

| Ex. | N—X—N— R    R | Hal | p/m | $Q_1$ | $Q_2$ | $Q_3$ | λmax ($H_2O$) |
|---|---|---|---|---|---|---|---|
| 2 | —HNCH$_2$CH$_2$NH— | F | p | —CH$_3$ | —H | —CH$_2$CH$_2$SO$_3$H | 424 |
| 3 | —HNCH$_2$CH$_2$NH— | Cl | p | —CH$_3$ | —CH$_2$SO$_3$H | —CH$_2$CH$_3$ | 420 |
| 4 | —HNCH$_2$CHNH— (CH$_3$) | Cl | m | —CH$_2$SO$_3$H | —CONH$_2$ | —CH$_3$ | 425 |
| 5 | —HN—C$_6$H$_4$—NH— | F | p | —CH$_3$ | —CH$_2$SO$_3$H | —CH$_2$CH$_3$ | 423 |
| 6 | —HNCH$_2$CH(OH)CH$_2$NH— | F | m | —COOH | —H | —H | 420 |
| 7 | —HNCHCH$_2$NH— (CH$_3$) | F | m | —CH$_3$ | —CH$_2$SO$_3$H | —CH$_2$CH$_3$ | 424 |
| 8 | —HN—C$_6$H$_4$—NH— | Cl | p | —CH$_3$ | —CONH$_2$ | —CH$_2$CH$_2$SO$_3$H | 421 |
| 9 | —HNCH$_2$CH$_2$NH— | Cl | p | —CH$_2$SO$_3$H | —CN | —CH$_2$CH$_3$ | 423 |
| 10 | —HNCHCH$_2$NH— (CH$_3$) | Cl | m | —CH$_3$ | —CH$_2$SO$_3$H | —CH$_3$ | 427 |
| 11 | —HN—C$_6$H$_3$(SO$_3$H)—NH— | F | p | —COOH | —H | —H | 419 |
| 12 | —HN—C$_6$H$_3$(CH$_3$)—NH— | F | p | —CH$_3$ | —CH$_2$SO$_3$H | —CH$_2$CH$_3$ | 424 |
| 13 | —N(piperazine)N— | F | p | —CH$_3$ | —CH$_2$SO$_3$H | —CH$_2$CH$_3$ | 422 |

Dyeing examples for hot and cold dyers

The following examples illustrate the possibilities of use of the described dyestuffs. The chlorine-containing dyestuffs are dyed according to Application Example A and the fluorine-containing dyestuffs according to Application Example B.

Application Example A

A dye bath consisting of 1000 parts of demineralized water, 80 parts of Glauber's salt (calcined), 1 part of sodium salt of 1-nitrobenzene-3-sulphonic acid and 1 part of the dyestuff from Example 1 was heated to 80° C. over the course of 10 minutes. Thereafter, 100 parts of mercerized cotton were immersed in the resultant solution. Dyeing was effected at 80° C. over 5 minutes before the solution was raised to 95° C. over 15 minutes. After 10 minutes at 95° C., 3 parts of soda were added, followed by a further 7 parts of soda after 20 minutes, and another 10 parts of soda after 30 minutes at 95° C. Dyeing subsequently continued for 60 minutes at 95° C. The dyed material was then removed from the dye bath, and rinsed for 2 minutes under running demineralized water at 60° C.±10° C. and for 1 minute under running tap water at 60° C.±10° C. The material was then washed twice for 10 minutes, each time in 5000 parts of boiling demineralized water, and subsequently rinsed for 2 minutes under running demineralized water at 60° C.±10° C., 1 minute under running tap water at 60° C.±10° C. and 1 minute under cold tap water. After drying, a brilliant greenish-yellow cotton dyeing with good fastness was obtained.

Application Example B

A dye bath consisting of 1000 parts of demineralized water, 80 parts of Glauber's salt (calcined) and 1 part of the dyestuff from Example 2 was heated to 50° C. over the course of 10 minutes. Thereafter, 100 parts of mercerized cotton were immersed in the resultant solution. After 25 minutes at 50° C., 0.7 parts of soda were added, followed by a further 1.3 parts of soda after 20 minutes, and another 2 parts of soda after 30 minutes at 50° C. The bath was subsequently heated over the course of 15 minutes to 60° C., and dyeing continued for 60 minutes at 60° C. The dyed material was then removed from the dye bath, and rinsed for 2 minutes under running demineralized water at 60° C.±10° C. and for 1 minute under running tap water at 60° C.±10° C. The dyed material was then washed twice for 10 minutes, each time in 5000 parts of boiling demineralized water, and subsequently rinsed for 2 minutes under running demineralized water at 60° C.±10° C., 1 minute under running tap water at 60° C.±10° C. and 1 minute under cold tap water. After drying, a brilliant greenish-yellow cotton dyeing with good fastness was obtained.

The dyestuffs of Examples 3 to 13 or dyestuff mixtures of Examples 1 to 13 were used for dyeing cotton in an analogous manner to that described in Examples A and B. Brilliant yellow dyeings were obtained, which displayed good fastness properties.

Application Example C

A printing paste having the components

| |
| --- |
| 40 parts of the dyestuff of Example 1 |
| 100 parts of urea |
| 330 parts of water |
| 500 parts ot a 4% sodium alginate thickener |
| 10 parts of the sodium salt ot 1-nitrobenzene-3-sulphonic acid |
| 20 parts of soda |
| 1000 parts in all | was applied to cotton material by conventional printing processes. The printed and dried material was steamed for 4–8 minutes at 102°–105° C. before being given a cold and a hot rinse. The fixed cotton material was subsequently washed at the boil (analogously to Example A) and dried. The greenish-yellow print obtained had good all-round fastness properties.

The dyestuffs of examples 2 to 13 were also used for printing cotton analogously to the method of example C. In all cases, brilliant yellow prints with good fastness properties were obtained.

I claim:

1. The compound of formula I or the salts thereof, wherein $Q_1$ is selected from the group consisting of hydrogen, $C_1$–$C_4$-alkyl, —$CH_2SO_3H$ and —COOH, $Q_2$ is selected from the group consisting of hydrogen, —CN, —$CONH_2$ and —$CH_2SO_3H$, $Q_3$ is selected from the group consisting of hydrogen, $C_1$–$C_4$-alkyl and substituted $C_1$–$C_4$-alkyl, each group R, independently of one another is selected from the group consisting of hydrogen and $C_1$–$C_4$-alkyl, each group R together represent a $C_1$–$C_4$-alkylene bridge, X is selected from the group consisting of an aliphatic and aromatic connecting member, Hal is selected from chlorine and fluorine and the carbonyl carbon atom of the group —CONH— is bonded to the phenyl radical at the 3- or 4-position.

2. The compound according to claim 1, having formula Ia

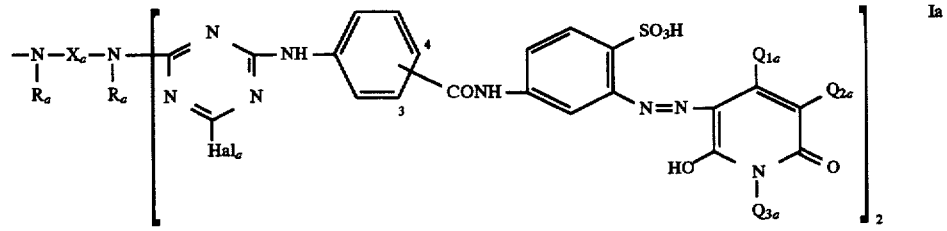

or the salts thereof, wherein

- $Q_{1a}$ is selected from the group consisting of methyl, —$CH_2SO_3H$ and COOH,
- $Q_{2a}$ denotes —$CH_2SO_3H$,
- $Q_{3a}$ is selected from the group consisting of hydrogen, methyl, ethyl, methyl substituted by a sulphonic acid radical substituent and ethyl substituted by a sulphonic acid radical substituent,
- $R_a$ denotes hydrogen, each $R_a$ taken together represent an ethylene bridge,
- $X_a$ is selected from the group consisting of a straight-chain $C_2$–$C_3$ alkylene bridge, a branched $C_2$–$C_3$ alkylene bridge, a straight-chain $C_2$–$C_3$ alkylene bridge substituted by an hydroxyl substituent, a branched $C_2$–$C_3$-alkylene bridge substituted by an hydroxyl substituent, a phenylene bridge, a phenylene bridge substituted by a methyl substituent and a phenylene bridge substituted by a sulphonic acid radical substituent,
- $Hal_a$ signifies chlorine, and the carbonyl carbon atom of the group —CONH— is bonded to the phenyl radical at the 3- or 4- position.

3. The compound according to claim 2 having the formula

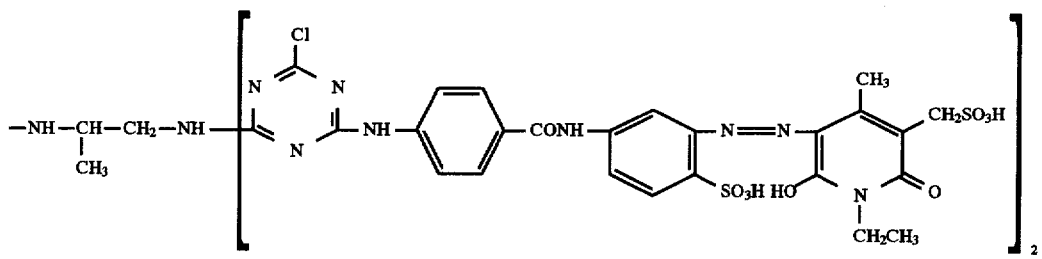

4. A process for the production of the compound according to claim 1 having formula I, comprising reacting a compound of formula II

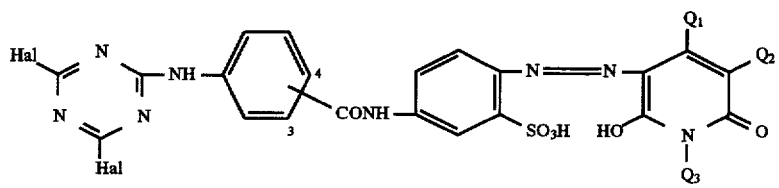

with a compound of formula III

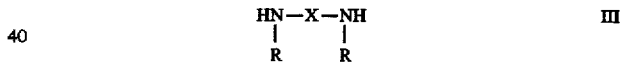

wherein $Q_1$, $Q_2$, $Q_3$, R, X and Hal are as defined in claim 1.